United States Patent
Tan et al.

(10) Patent No.: US 12,471,522 B2
(45) Date of Patent: Nov. 18, 2025

(54) RICE AND WHEAT NITROGEN NUTRITION MULTISPECTRAL DIAGNOSIS METHOD FOR PRECISE FERTILIZATION BY UNMANNED AERIAL VEHICLES

(71) Applicant: Yangzhou University, Jiangsu (CN)

(72) Inventors: Changwei Tan, Jiangsu (CN);
Changrong Shi, Jiangsu (CN);
Qingqing Hong, Jiangsu (CN);
Zhenwang Li, Jiangsu (CN); Yunqin Yang, Jiangsu (CN); Zhixin Lu, Jiangsu (CN)

(73) Assignee: Yangzhou University, Yangzhou (CN)

( * ) Notice: Subject to any disclaimer, the term of this patent is extended or adjusted under 35 U.S.C. 154(b) by 49 days.

(21) Appl. No.: 19/031,335

(22) Filed: Jan. 18, 2025

(65) Prior Publication Data
US 2025/0280757 A1   Sep. 11, 2025

(30) Foreign Application Priority Data
Mar. 11, 2024   (CN) .......................... 202410271406.7

(51) Int. Cl.
*A01C 21/00* (2006.01)
*A01G 22/22* (2018.01)
(Continued)

(52) U.S. Cl.
CPC ............ *A01C 21/007* (2013.01); *A01G 22/22* (2018.02); *G06T 7/0012* (2013.01); *G06T 7/194* (2017.01);
(Continued)

(58) Field of Classification Search
CPC .... A01C 21/007; A01G 22/22; G06T 7/0012; G06T 7/194; G06T 2207/10036;
(Continued)

(56) References Cited

U.S. PATENT DOCUMENTS

| | | | |
|---|---|---|---|
| 2017/0039449 A1* | 2/2017 | Scharf | A01C 21/007 |
| 2020/0141877 A1* | 5/2020 | Zhu | G06T 7/40 |

FOREIGN PATENT DOCUMENTS

| | | | |
|---|---|---|---|
| CN | 116602106 A | * | 8/2023 |
| CN | 117347283 A | | 1/2024 |

OTHER PUBLICATIONS

English translation for CN-116602106-A (Year: 2023).*

* cited by examiner

*Primary Examiner* — Lee E Rodak
*Assistant Examiner* — Byung Ro Lee (57) ABSTRACT

Disclosed is a rice and wheat nitrogen nutrition multispectral diagnosis method for precise fertilization by unmanned aerial vehicles (UAVs), including: step 1, acquiring multispectral UAV remote sensing images and collecting agronomic parameters of rice and wheat, and establishing a nitrogen nutrition spectral diagnosis model; and step 2, calculating a critical nitrogen concentration in aboveground parts of rice and wheat based on a critical nitrogen concentration dilution model for amount of dry matter, and further obtaining a critical nitrogen uptake; calculating an actual nitrogen uptake in the aboveground parts of rice and wheat based on the nitrogen nutrition spectral diagnosis model; and obtaining a recommended nitrogen topdressing amount for rice and wheat during corresponding stages based on the critical nitrogen uptake and the actual nitrogen uptake. The present disclosure ensures stable yields of rice and wheat while reducing input of chemical fertilizers and labor, presenting a promising application prospect.

6 Claims, 4 Drawing Sheets

(51) Int. Cl.
  *G06T 7/00* (2017.01)
  *G06T 7/194* (2017.01)
  *G06V 10/25* (2022.01)
  *G06V 20/10* (2022.01)
  *G06V 20/17* (2022.01)

(52) U.S. Cl.
  CPC .............. *G06V 10/25* (2022.01); *G06V 20/17* (2022.01); *G06V 20/188* (2022.01); *G06V 20/194* (2022.01); *G06T 2207/10036* (2013.01); *G06T 2207/20132* (2013.01); *G06T 2207/30188* (2013.01)

(58) Field of Classification Search
  CPC ........... G06T 2207/20132; G06T 2207/30188; G06V 10/25; G06V 20/17; G06V 20/188; G06V 20/194
  See application file for complete search history.

RICE AND WHEAT NITROGEN NUTRITION MULTISPECTRAL DIAGNOSIS METHOD FOR PRECISE FERTILIZATION BY UNMANNED AERIAL VEHICLES

CROSS-REFERENCE TO RELATED APPLICATION

This application claims priority of Chinese Patent Application No. 202410271406.7, filed on Mar. 11, 2024, the entire contents of which are incorporated herein by reference.

TECHNICAL FIELD

The present disclosure relates to the field of modern agriculture, and specifically relates to the remote sensing diagnosis of rice and wheat nitrogen nutrition based on multispectral unmanned aerial vehicle (UAV) images and a precise fertilization method for agricultural UAVs based on critical nitrogen concentration.

BACKGROUND

The amount of nitrogen fertilizer application not only significantly affects biomass accumulation and grain yield, but also affects the protein content of grains, thereby affecting the quality of grains. The yield of rice and wheat generally increases as the nitrogen application amount increases, but excessive amount significantly reduces utilization rate of nitrogen fertilizer instead of significantly improving crop yield, resulting in progressively decreased yield. Currently, topdressing by UAVs largely relies on experience, with more focus on the uniformity of fertilizer application rather than the actual fertilizer demand of the crops, considering no relationship between fertilizer application and crop nutrient demand, leading to low utilization rate of fertilizer, thus causing issues such as nutrient loss.

Therefore, how to quickly and accurately diagnose the nitrogen nutrition of plants, establish a remote sensing diagnosis method for crop nitrogen nutrition balance suitable for precise fertilization with agricultural UAVs, and solve the mismatch between fertilization and crop nutrient demand is a problem that urgently needs to be solved.

SUMMARY

An objective of the present disclosure is to solve the problem that using the prior art fails to achieve real-time nutritional diagnosis of crops for fertilization that is often based on experience, and fails to perform individual fertilization on a target specific region with poor growth. In the present disclosure, multispectral UAVs are used for nutritional diagnosis of crops, critical nitrogen concentration is utilized to calculate the nitrogen deficiency of plants at different growth stages, and a variable rate fertilization system equipped on the agricultural UAVs is leveraged to achieve precise fertilization of plants at different times. Through this method, the nutritional balance status of plants can be obtained quickly and easily, enabling point-to-point precise fertilization using agricultural UAVs.

To achieve the above objective, the present disclosure employs the following technical solutions: a rice and wheat nitrogen nutrition multispectral diagnosis method for precise fertilization by UAVs, including the following steps.

Step 1, a rice and wheat nitrogen nutrition remote sensing diagnosis module is configured to acquire multispectral UAV remote sensing images and collect agronomic parameters of rice and wheat, and establish a diagnosis model based on the multispectral UAV remote sensing images and an acquired nitrogen concentration using machine learning algorithms.

Step 2, a topdressing decision model generation module is configured. It is known from the previous study that the nitrogen concentration of crops decreases as the dry matter accumulation increases. The critical nitrogen concentration refers to the minimum nitrogen concentration required for crops to achieve maximum dry matter accumulation within a certain growth period. A critical nitrogen concentration dilution model for dry matter is formed based on this theory, expressed as $Nc=a*AGB^{(-b)}$. With the aboveground dry biomass of rice and wheat in the study region as the abscissa and the aboveground nitrogen concentration as the ordinate, a critical nitrogen concentration dilution model for this region can be modeled. According to the critical nitrogen concentration dilution model based on dry matter mass proposed by previous study, the critical nitrogen concentration in aboveground parts (stems and leaves) of rice and wheat is calculated. The actual nitrogen uptake in the aboveground parts of rice and wheat is calculated using the model trained in step 1. Based on the critical nitrogen concentration of the aboveground part, the critical nitrogen uptake and the actual nitrogen uptake are calculated, and then the recommended nitrogen topdressing amount for rice and wheat during the corresponding growth stages is calculated.

Step 3, a digital multi-dimensional prescription map generation and agricultural UAV precise fertilization module is configured to use Super map, GlobalMapper and other software to save the recommended nitrogen application amount as an elevation image and generate a digital fertilization prescription map, providing an "intelligent brain" for precise operation by agricultural UAVs, and guiding agricultural UAVs for precise fertilization operations.

Preferably, step 1 includes the following steps.

Step 1.1, data acquisition: multispectral UAV images of rice and wheat under different nitrogen fertilizer gradients during key fertilization stages (jointing stage and booting stage) of rice and wheat are acquired, and destructive sampling is performed on each sub-region using a five-point sampling method.

Step 1.2, agronomic parameter acquisition: the collected rice and wheat samples are killed out at 105° C. for 30 min and then dried to a constant weight at 80° C. The dried samples are weighed to calculate the biomass before being crushed, and leaf nitrogen content (LNC) of the samples collected from each sub-region is determined using a Kjeldahl nitrogen analyzer.

Step 1.3, multispectral UAV image processing: the acquired multispectral UAV images are spliced using DJI software while performing radiometric calibration, and a digital number (DN) is converted to reflectance through a reflective plate with three reflectances of 0.25, 0.5, and 0.95, to generate a tag image file format (TIFF) file of orthoimages for a study region.

Step 1.4, soil background value removal: due to the small size of the plants in early stages, the reflection from the soil and water between the plants has a significant impact on the results of remote sensing diagnosis. Therefore, soil and water background values are removed from multispectral UAV images captured during the tillering and regreening stages. As one of the common vegetation indices for reflecting crop growth trend, normalized difference vegetation index (NDVI) is taken as a primary vegetation index for classifying soil, water, and crops. NDVI directly calculated by DJI software and true-color remote sensing images are imported into Arcmap software, and a critical NDVI value for soil and plant is found in the layer attributes. "> critical NDVI value" is inputted in "Raster Calculator" in Arcmap. The name and storage path of the generated raster are set in "Output raster" to generate new raster data with soil removed. The newly generated raster data is inputted into "Raster to polygon" and is converted into vector data. The vector data is used to crop the original data to obtain images with soil background removed.

Step 1.5, UAV vegetation index extraction: "band math" of environment for visualizing image (ENVI) and a vegetation index formula are used to perform band math on the multispectral UAV images to calculate vegetation indices. The multispectral UAV images are divided into regions of interest using Arcmap software, and an average value of vegetation indices within each region of interest is extracted, and the average value is used to represent a vegetation index for each sub-region.

Step 1.6, data analysis: the vegetation indices obtained in step 1.5 and LNC obtained from experiments in step 1.2 are subjected to correlation analysis: a vegetation index with the highest correlation to LNC is selected as an optimal vegetation index for linear modeling; using the optimal vegetation index as the abscissa and the LNC as the ordinate, linear, exponential, polynomial, and logarithmic modeling is performed; and using an absolute coefficient ($R^2$) and root mean square error (RMSE) as evaluation indicators of the model, the model is evaluated, and an optimal nitrogen nutrition spectral diagnosis model is selected and established.

Preferably, step 2 includes the following steps.

Step 2.1, the critical nitrogen concentration of rice and wheat is calculated based on the dry biomass obtained in step 1.2 and a critical nitrogen concentration dilution curve proposed by previous study.

Step 2.2, an aboveground nitrogen concentration y1 of the plant is obtained based on the nitrogen nutrition spectral diagnosis model, and the actual nitrogen uptake of rice and wheat is obtained based on a product of the aboveground nitrogen concentration y1 and a dry biomass y2 of the plant.

Step 2.3, the critical nitrogen uptake of rice and wheat is calculated based on a product of the critical nitrogen concentration of plant obtained in step 2.1 and the dry biomass of plant.

Step 2.4, a difference value between a critical nitrogen uptake and an actual nitrogen uptake of rice is calculated according to the difference value between the actual nitrogen uptake of rice obtained in step 2.2 and the critical nitrogen uptake of rice obtained in step 2.3.

Step 2.5, a theoretical nitrogen deficiency, i.e., a theoretical nitrogen application amount is calculated according to a ratio of the current growth duration of rice and wheat to the total growth duration.

Preferably, in step 2.2, the dry biomass of the collected samples is obtained in step 1.2 and the remote sensing images are acquired. With the dry biomass as the ordinate y, correlation analysis is performed between the vegetation index calculated using the remote sensing images and the dry biomass. A vegetation index with the highest correlation is selected as the abscissa x for modeling, obtaining a model of y2=kx+b, which is used for monitoring plant dry biomass in the plot through the remote sensing images; and the actual nitrogen uptake of rice and wheat is a product of y1 and y2.

Preferably, step 3 includes the following steps.

Step 3.1, a new data source is created in Super map software, and a tif file of the multispectral UAV images is imported.

Step 3.2, a polygon dataset is created in Super map software based on the theoretical nitrogen application amount Nd calculated in the above step, the required fertilization amount is calculated based on the nitrogen content of urea, and a plot requiring fertilization is drawn to add data.

Step 3.3, a vector polygon dataset is converted to an shp dataset.

Step 3.4, shp data is converted into Arcmap and the imported shp file is converted to a raster.

Step 3.5, the raster converted in step 3.4 is written to a raster data name with an extension name in a user-defined manner, a pixel type is changed to 3_BIT_FLOAT, and the band is changed to 1.

Step 3.6, the new raster embedded in step 3.5 is converted to tif format.

Step 3.7, the tif file is imported into GlobalMapper, 32-bit floating-point samples are selected, always generating square pixels is deselected to generate a TFW file.

Step 3.8, the elevation image is saved according to a storage path of the agricultural UAVs to generate a digital fertilization prescription map recognizable by the agricultural UAVs.

The present disclosure also provides a rice and wheat nitrogen nutrition multispectral diagnosis system for precise fertilization by UAVs, including: a rice and wheat nitrogen nutrition remote sensing diagnosis module, configured to acquire multispectral UAV remote sensing images, collect agronomic parameters of rice and wheat, and establish a nitrogen nutrition spectral diagnosis model based on the multispectral UAV remote sensing images and the acquired agronomic parameters using machine learning algorithms;

a topdressing decision model generation module, configured to calculate the critical nitrogen concentration in the aboveground parts of rice and wheat based on the critical nitrogen concentration dilution model for the amount of dry matter, and further calculate the critical nitrogen uptake; calculate the actual nitrogen uptake in the aboveground parts of rice and wheat based on the rice and wheat nitrogen nutrition remote sensing diagnosis module; and calculate the recommended nitrogen topdressing amount for rice and wheat during corresponding stages based on the critical nitrogen uptake and the actual nitrogen uptake; and a digital multi-dimensional prescription map generation and agricultural UAV precise fertilization module, configured to use Super map, GlobalMapper software to save the recommended nitrogen application amount as an elevation image, generate the digital fertilization prescription map, and guide agricultural UAVs for precise fertilization operations.

Advantageous Effects

In the present disclosure, consumer-grade multispectral UAVs are employed to acquire images of rice and wheat growth, and a nitrogen nutrition parameter dynamic diagnostic model is established; based on the critical nitrogen concentration dilution model, rapid diagnosis of nitrogen nutrition is achieved and a fertilization prescription map is generated; and the recommended nitrogen application amount calculated guides precise fertilization by agricultural UAVs. This method ensures stable yields of rice and wheat while reducing input of chemical fertilizers and labor, offering convenience and presenting a promising application prospect.

DETAILED DESCRIPTION

The present disclosure is further described in detail with reference to the accompanying drawings.

The present disclosure provides a rice and wheat nitrogen nutrition multispectral diagnosis method for precise fertilization by UAVs. This method includes three major modules: a rice and wheat nitrogen nutrition remote sensing diagnosis module, a topdressing decision model generation module, and a digital multi-dimensional prescription map generation and agricultural UAV precise fertilization module. In the present disclosure, multispectral UAVs are employed to acquire images of rice and wheat growth, and a nitrogen nutrition parameter remote sensing diagnosis model is established. Files recognizable by agricultural UAVs are created according to the recommended nitrogen application amount calculated from critical nitrogen concentration, to guide precise fertilization operations by agricultural UAVs. This method ensures stable yields of rice and wheat while reducing input of chemical fertilizers and labor, facilitating convenient application and presenting a promising practical application.

As shown in FIG. 1 to FIG. 4, the following steps are included.

Figure 1:
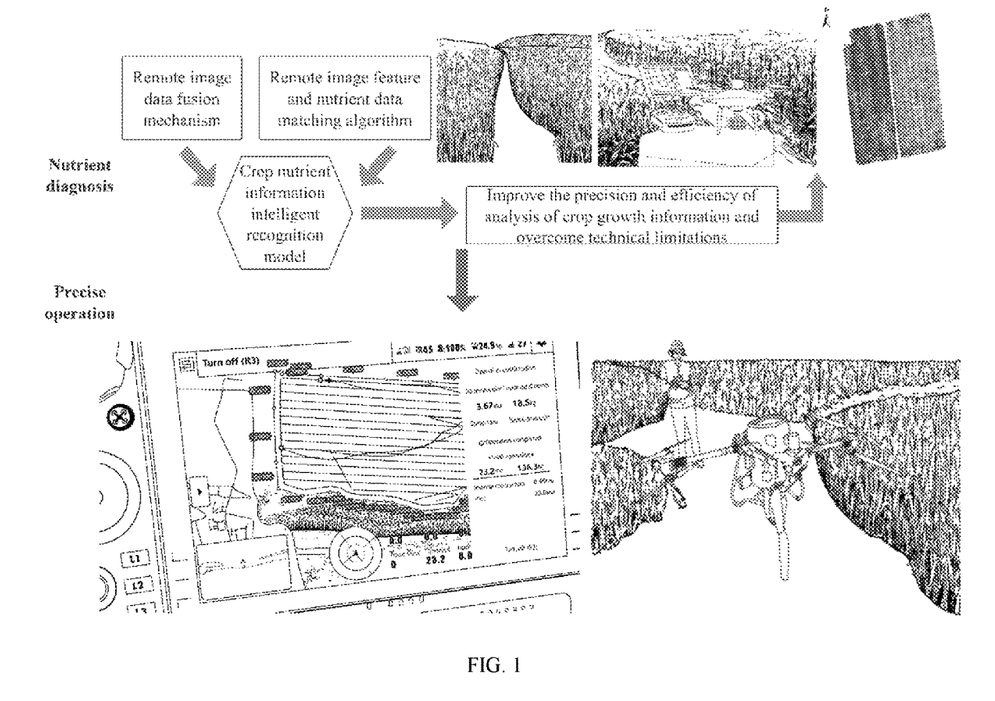
FIG. 1 is an implementation structural diagram of a rice and wheat nitrogen nutrition multispectral diagnosis method for precise fertilization by UAVs according to the present disclosure.
Figure 2:
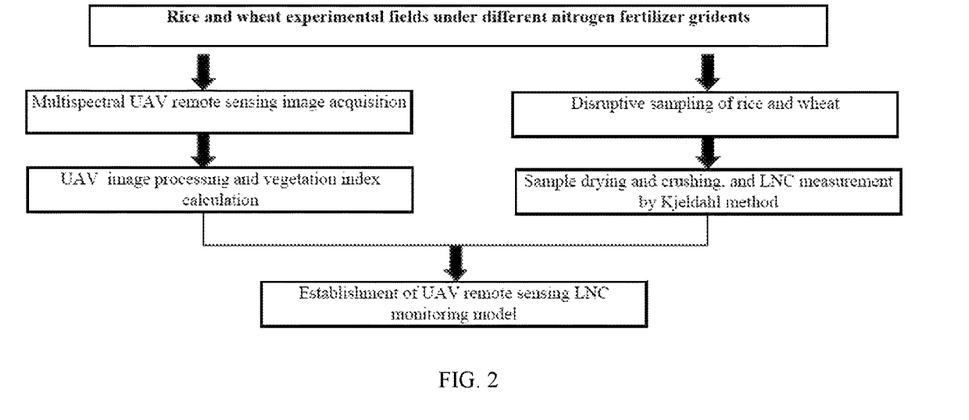
FIG. 2 is a system block diagram of a rice and wheat nitrogen nutrition remote sensing diagnosis module according to the present disclosure.

Step 1, a rice and wheat nitrogen nutrition remote sensing diagnosis module is configured to acquire multispectral UAV remote sensing images and collect agronomic parameters of rice and wheat, and establish a remote sensing diagnosis model based on the multispectral UAV remote sensing images and an acquired nitrogen concentration using machine learning algorithms.

Step 1.1, data acquisition: multispectral UAV images of rice and wheat under different nitrogen fertilizer gradients during key fertilization stages of rice and wheat are acquired; and destructive sampling is performed on each sub-region using a five-point sampling method. It is to be noted that the "key fertilization stages" refer to the jointing stage and the booting stage.

Step 1.2, agronomic parameter acquisition: the collected rice and wheat samples are killed out at 105° C. for 30 min and then dried to a constant weight at 80° C. The dried samples are weighed to calculate the biomass before being crushed, and LNC of the samples collected from each sub-region is determined using a Kjeldahl nitrogen analyzer.

Step 1.3, multispectral UAV image processing: the acquired multispectral UAV images are spliced using DJI software while performing radiometric calibration, and a DN is converted to reflectance through a reflective plate with three reflectances of 0.25, 0.5, and 0.95, to generate a TIFF file of orthoimages for a study region.

Step 1.4, soil background value removal: due to the small size of the plants in the early stages, the reflection from the soil and water between the plants has a significant impact on the results of remote sensing diagnosis. Therefore, soil and water background values are removed from multispectral UAV images captured during the tillering and regreening stages. As one of the common vegetation indices for reflecting crop growth trend, NDVI is taken as a primary vegetation index for classifying soil, water, and crops. NDVI directly calculated by DJI software and true-color remote sensing images are imported into Arcmap software, and a critical NDVI value for soil and plant is found in the layer properties. "> critical NDVI value" is inputted in "Raster Calculator" in Arcmap. The name and storage path of the generated raster are set in "Output raster" to generate new raster data with soil removed. The newly generated raster data is inputted into "Raster to polygon" and is converted to vector data. The vector data is used to crop the original data to obtain images with soil background removed.

Figure 5:
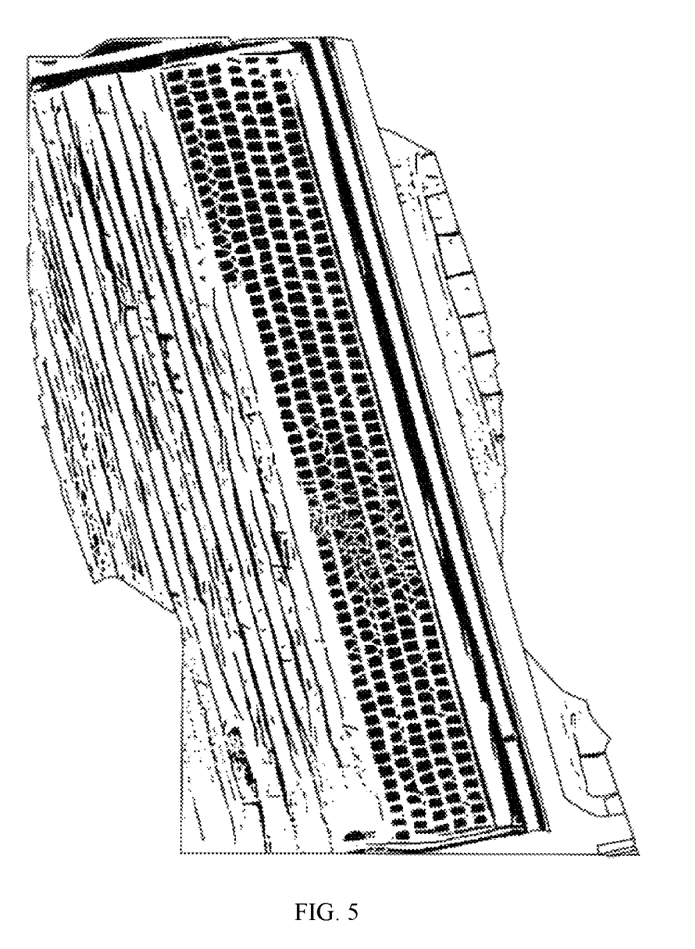
FIG. 5 is an experimental diagram of vegetation region division according to an example of the present disclosure.

Step 1.5, UAV vegetation index extraction: "band math" of ENVI and a vegetation index formula are used to perform band math on the multispectral UAV images to calculate vegetation indices. The multispectral UAV images are divided into regions of interest using Arcmap software, and an average value of vegetation indices within each region of interest is extracted, and the average value is used to represent a vegetation index for each sub-region, as shown in FIG. 5.

Step 1.6, data analysis: the vegetation indices obtained in step 1.5 and the LNC obtained from the experiments in step 1.2 are subjected to correlation analysis: the LNC is calculated through the Kjeldahl method from a small number of samples collected, and a vegetation index with the highest correlation to LNC is selected (the vegetation index is calculated from images obtained by UAVs) as an optimal vegetation index for linear modeling. With the optimal vegetation index as the abscissa and the LNC as the ordinate, linear, exponential, polynomial, and logarithmic modeling is performed. With $R^2$ and RMSE as evaluation indicators of the model, the model is evaluated. Based on machine learning algorithms, regression modeling is performed between vegetation indices and nitrogen nutrition concentration, and the optimal nitrogen nutrition spectral diagnosis model (i.e., the UAV remote sensing LNC monitoring model in FIG. 2) is selected and established, represented as $y1=kx+b$. This model is used to monitor the LNC in the plot through remote sensing images. In this example, taking the jointing stage of wheat as an example: the remote sensing images are preprocessed and spectral data is extracted to calculate vegetation indices. The vegetation index with the highest correlation to LNC is selected, which is the ratio vegetation index (RVI), with a correlation coefficient $r=-0.792$. Using RVI as x and LNC as y, a model is established: $y=-0.8592x+5.2054$ (x represents RVI and y represents LNC). $R^2=0.58$.

Figure 3:
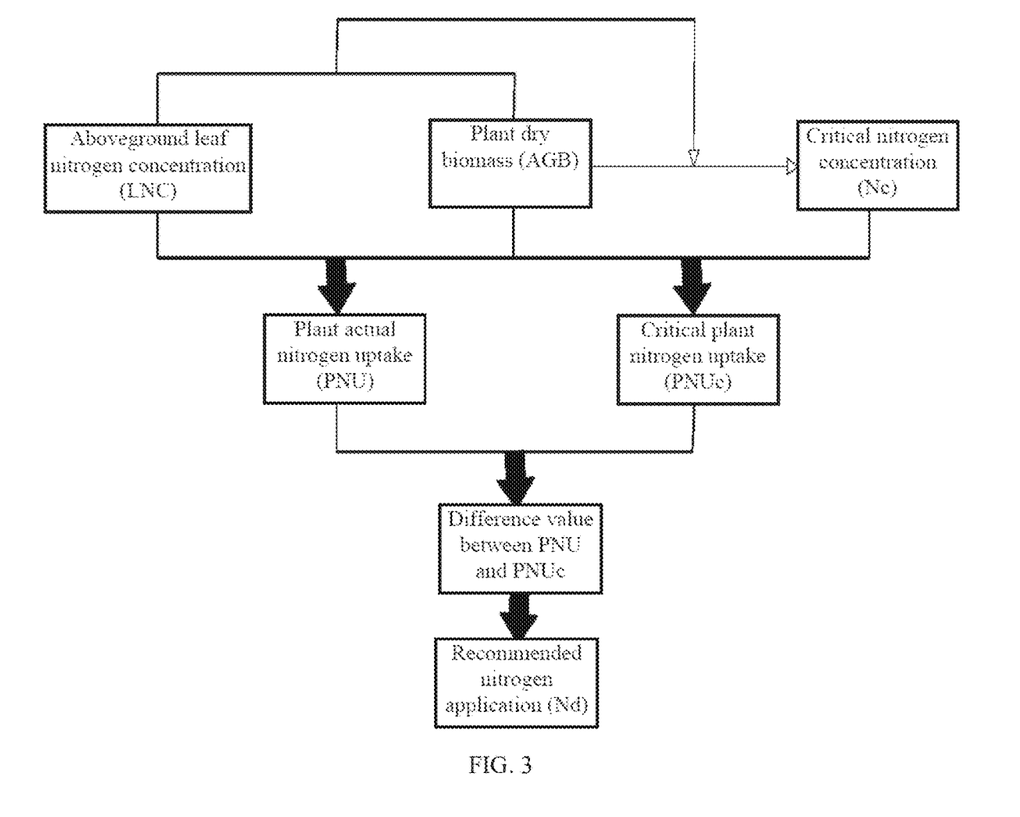
FIG. 3 is a system block diagram of a rice and wheat topdressing decision model generation module according to the present disclosure.

In step 2, according to the critical nitrogen concentration dilution model based on the amount of dry matter, the critical nitrogen concentration of the aboveground parts of rice and wheat is calculated. The actual nitrogen uptake of the aboveground parts of rice and wheat is calculated using the model trained in step 1. Based on the critical nitrogen concentration of the aboveground part, the critical nitrogen uptake is calculated. Based on the critical nitrogen uptake and the actual nitrogen uptake, the recommended nitrogen topdressing amount for rice and wheat during corresponding growth stages is calculated. It is to be noted that "aboveground parts" refer to the stem, leaves, flowers, fruits, and seeds of a plant. In the present application, the aboveground parts of rice and wheat specifically refer to the stem and leaves.

Step 2.1, the critical nitrogen concentration of rice and wheat is calculated based on the dry biomass obtained in step 1.2 and the critical nitrogen concentration dilution curve proposed by previous study.

The nitrogen concentration of crops decreases as the dry matter accumulation increases. The critical nitrogen concentration refers to the minimum nitrogen concentration required for crops to achieve maximum dry matter accumulation within a certain growth period. The critical nitrogen concentration dilution model for dry matter is formed based on this theory, expressed as $Nc=a*AGB^{(-b)}$, where Nc represents the critical nitrogen concentration in the aboveground part of the plant, AGB represents the dry biomass of the aboveground part of the plant, a represents the nitrogen concentration when the dry biomass of the aboveground part is 1 $t \cdot hm^{-2}$, and b represents the ratio of the relative accumulation rate of nitrogen to biomass. Step 2.2, the actual nitrogen uptake of rice and wheat is calculated based on a product of the aboveground nitrogen concentration of plant and the dry biomass of plant. The dry biomass of the collected samples is obtained in step 1.2 and the remote sensing images are acquired. With the dry biomass as the ordinate y, correlation analysis is performed between the vegetation index calculated using remote sensing images and the dry biomass. A vegetation index with the highest correlation is selected as the abscissa x for modeling, obtaining a model of $y2=kx+b$, which is used for monitoring plant dry biomass in the plot through remote sensing images; and the actual nitrogen uptake of rice and wheat is a product of y1 and y2. Step 2.3, the critical nitrogen uptake of rice and wheat is calculated based on a product of the critical nitrogen concentration of plant obtained in step 2.1 and the dry biomass of plant.

Step 2.4, a difference value between the critical nitrogen uptake and the actual nitrogen uptake of rice is calculated based on the difference value between the actual nitrogen uptake of rice calculated in step 2.2 and the critical nitrogen uptake of rice calculated in step 2.3.

Step 2.5, a theoretical nitrogen deficiency, i.e., a theoretical nitrogen application amount is calculated according to a ratio of the current growth duration of rice and wheat to the total growth duration.

Figure 4:
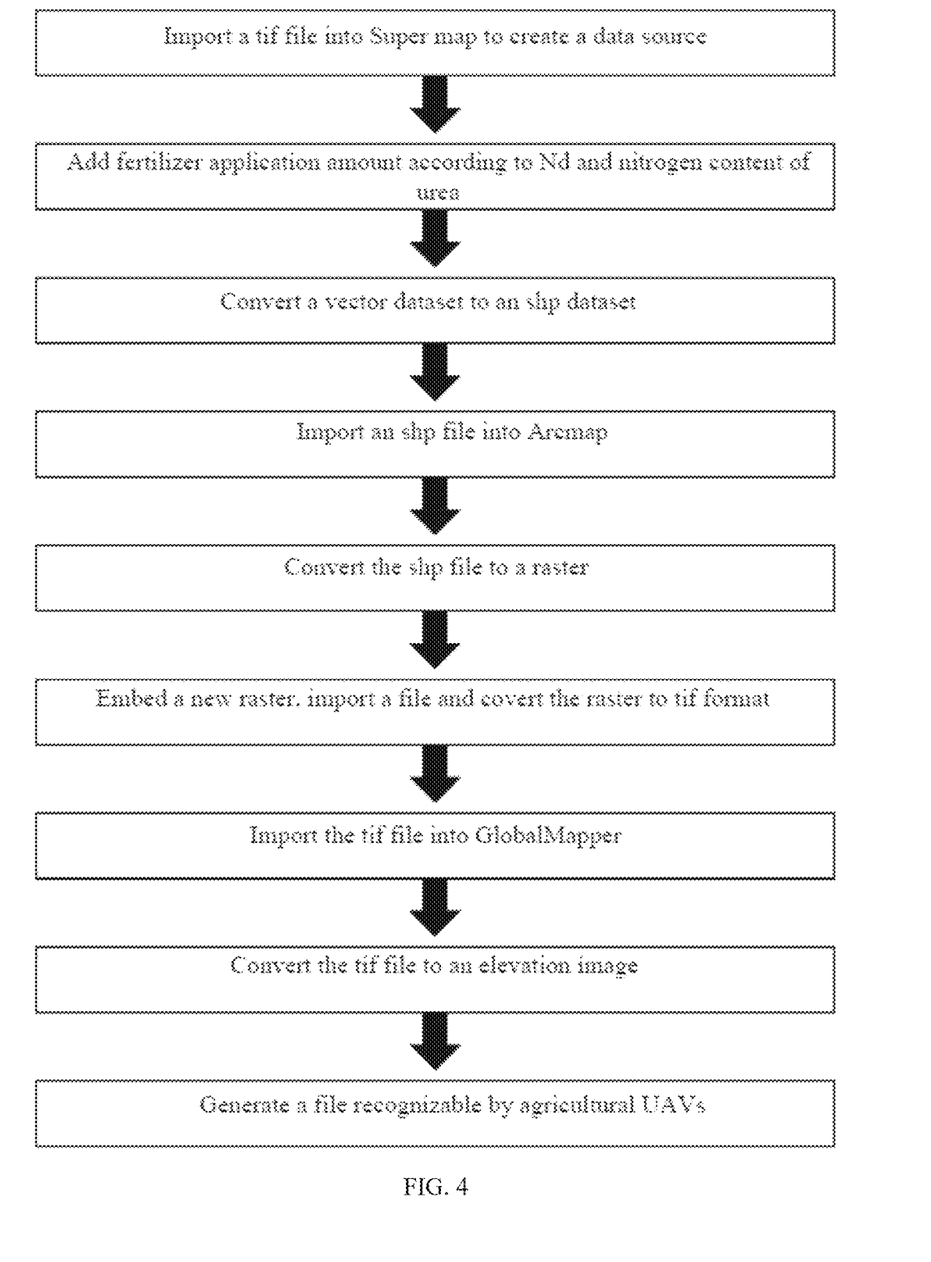
FIG. 4 is a system block diagram of a digital multi-dimensional prescription map generation and agricultural UAV precise fertilization module according to the present disclosure.

Step 3, a digital multi-dimensional prescription map generation and agricultural UAV precise fertilization module is configured to use Super map, GlobalMapper and other software to save the recommended nitrogen application amount as an elevation image and generate a digital fertilization prescription map, providing an "intelligent brain" for precise operation by agricultural UAVs, and guiding agricultural UAVs for precise fertilization operations.

Step 3.1, a new data source is created in Super map software (i.e., a new blank page is created in the software) and a tif file of the multispectral UAV images (i.e., the TIFF file of orthoimages in the study region obtained in step 1.3) is imported.

Step 3.2, a polygon dataset is created in Super map software based on the theoretical nitrogen application amount Nd, the required fertilization amount is calculated based on the nitrogen content of urea, and a plot requiring fertilization is drawn to add data. The nitrogen content of urea generally ranges from 42% to 46%, depending on the specific urea nitrogen content of the fertilizer applied.

Step 3.3, a vector polygon dataset is converted to an shp dataset.

Step 3.4, shp data is converted into Arcmap and the imported shp file is converted to a raster.

Step 3.5, the raster converted in step 3.4 is written to a raster data name with an extension name in a user-defined manner, a pixel type is changed to 3_BIT_FLOAT, and the band is changed to 1.

Step 3.6, the new raster embedded in step 3.5 is converted to tif format.

Step 3.7, the tif file is imported into GlobalMapper, 32-bit floating-point samples are selected, always generating square pixels is deselected to generate a TFW file.

Step 3.8, the elevation image is saved according to a storage path of the agricultural UAVs to generate a digital fertilization prescription map recognizable by the agricultural UAVs.

In the present disclosure, remote sensing technology is employed to conduct real-time monitoring and nutritional diagnosis of crops in field, enabling the application of fertilizers according to the specific conditions of the field and the crop seedlings, and reducing the errors caused by human experience-based fertilization and addressing the issue of insufficient fertilizer application tailored to the needs of individual field plots.

It is to be noted that: the above are only preferred examples of the present disclosure and are not used to limit the present disclosure. Although the present disclosure is described in detail by reference to the examples mentioned above, for those skilled in the art, the technical solutions recorded in the examples mentioned above can be modified or some technical features thereof can be replaced equivalently. Any modifications, equivalents and improvements made within the spirit and principle of the present disclosure are included in the scope of protection of the present disclosure.

The invention claimed is:

1. A rice and wheat nitrogen nutrition multispectral diagnosis method for precise fertilization by unmanned aerial vehicles (UAVs), comprising the following steps:
   step 1, acquiring multispectral UAV remote sensing images and collecting agronomic parameters of rice and wheat, and establishing a nitrogen nutrition spectral diagnosis model based on the remote sensing images and the agronomic parameters of rice and wheat;
   step 1.1, data acquisition: acquiring multispectral UAV images of rice and wheat under different nitrogen fertilizer gradients during key fertilization stages of rice and wheat; and dividing the multispectral UAV images into regions of interest to obtain a plurality of sub-regions, and using a five-point sampling method to perform destructive sampling on each sub-region;
   step 1.2, agronomic parameter acquisition: processing rice and wheat samples to obtain dry biomass, and measuring leaf nitrogen content (LNC);
   step 1.3, multispectral UAV image processing: splicing the acquired multispectral UAV images while performing radiometric calibration, and converting a digital number (DN) to reflectance based on a set of reflective plates with different reflectances to generate a tag image file format (TIFF) file of orthoimages for a study region;

step 1.4, soil background value removal: removing soil and water background values from multispectral UAV images of rice and wheat in tillering and regreening stages during the key fertilization stages;

step 1.5, UAV vegetation index extraction: using "band math" of environment for visualizing image (ENVI) and a vegetation index formula to perform band math on the multispectral UAV images to calculate vegetation indices; and extracting an average value of vegetation indices within each region of interest, and using the average value to represent a vegetation index for each sub-region; and step 1.6, data analysis: performing correlation analysis on the vegetation indices obtained in step 1.5 and the LNC obtained in step 1.2 to establish a nitrogen nutrition spectral diagnosis model;

step 2, calculating a critical nitrogen concentration in aboveground parts of rice and wheat based on a critical nitrogen concentration dilution model for dry biomass, and further obtaining a critical nitrogen uptake; calculating an actual nitrogen uptake in the aboveground parts of rice and wheat based on the nitrogen nutrition spectral diagnosis model; and obtaining a recommended nitrogen topdressing amount for rice and wheat during corresponding stages based on the critical nitrogen uptake and the actual nitrogen uptake, specifically:

step 2.1, calculating the critical nitrogen concentration of rice and wheat based on the dry biomass in step 1.2 combined with a critical nitrogen concentration dilution curve;

step 2.2, obtaining an aboveground nitrogen concentration y1 of the plant based on the nitrogen nutrition spectral diagnosis model, and obtaining the actual nitrogen uptake of rice and wheat based on a product of the aboveground nitrogen concentration y1 and a dry biomass y2 of the plant;

step 2.3, calculating the critical nitrogen uptake of rice and wheat based on a product of the critical nitrogen concentration of rice and wheat obtained in step 2.1 and the dry biomass;

step 2.4, calculating a difference value between the actual nitrogen uptake of rice and wheat obtained in step 2.2 and the critical nitrogen uptake of rice and wheat obtained in step 2.3; and step 2.5, calculating a theoretical nitrogen deficiency, i.e., a theoretical nitrogen application amount Nd according to a ratio of the current growth duration of rice and wheat to the total growth duration; and step 3, saving the recommended nitrogen topdressing amount as an elevation image to generate a digital fertilization prescription map, guiding precise fertilization by agricultural UAVs, specifically:

step 3.1, creating a new data source in Super map software, and importing a tif file of the multispectral UAV images;

step 3.2, creating a polygon dataset in Super map software based on the theoretical nitrogen application amount Nd, calculating the required fertilization amount based on the nitrogen content of urea, and drawing a plot requiring fertilization to add data;

step 3.3, converting a vector polygon dataset to an shp dataset;

step 3.4, importing shp data into Arcmap and converting the imported shp file to a raster;

step 3.5, writing the raster converted in step 3.4 to a raster data name with an extension name in a user-defined manner, changing a pixel type to 3_BIT_FLOAT, and changing the band to 1;

step 3.6, converting the new raster embedded in step 3.5 to tif format;

step 3.7, importing the tif file into GlobalMapper, selecting 32-bit floating-point samples, deselecting always generating square pixels, and generating a TFW file; and step 3.8, saving the elevation image according to a storage path of the agricultural UAVs to generate a digital fertilization prescription map recognizable by the agricultural UAVs.

2. The rice and wheat nitrogen nutrition multispectral diagnosis method for precise fertilization by UAVs according to claim 1, wherein a method for establishing the nitrogen nutrition spectral diagnosis model specifically comprises: selecting a vegetation index with the highest correlation to LNC as an optimal vegetation index for linear modeling; using the optimal vegetation index as an abscissa x and the LNC as an ordinate y to conduct linear, exponential, polynomial, and logarithmic modeling; using an absolute coefficient $R^2$ and root mean square error (RMSE) as evaluation indicators to evaluate the model; and establishing an optimal nitrogen nutrition spectral diagnosis model, and obtaining a model of y1=kx+b, which is a model for monitoring LNC in the plot through remote sensing images.

3. The rice and wheat nitrogen nutrition multispectral diagnosis method for precise fertilization by UAVs according to claim 2, wherein step 1.2 specifically comprises: killing out the collected rice and wheat samples at 105° C.±5° C. for 30 min±5 min, followed by drying to a constant weight at 80° C.±5° C.; and weighing the dried samples to calculate biomass, followed by crushing, and using a nitrogen analyzer to determine the LNC of collected samples for each sub-region.

4. The rice and wheat nitrogen nutrition multispectral diagnosis method for precise fertilization by UAVs according to claim 2, wherein the background value removal in step 1.4 specifically comprises:

step 1.41, using normalized difference vegetation index (NDVI) as a primary vegetation index for classifying soil, water, and crops, and generating new raster data with soil removed;

step 1.42, importing NDVI directly calculated by DJI software and true-color remote sensing images into Arcmap software, finding a critical NDVI value for soil and plant in the layer properties, inputting "> critical NDVI value" in "Raster Calculator" in Arcmap, setting the name and storage path of the generated raster in "Output raster" to generate new raster data with soil removed; and step 1.43, inputting the newly generated raster data into "Raster to polygon" in Arcmap, and converting the same into vector data; and cropping the original data using the vector data to obtain images with soil background removed.

5. The rice and wheat nitrogen nutrition multispectral diagnosis method for precise fertilization by UAVs according to claim 4, wherein in step 2.2, the dry biomass of the collected samples is obtained in step 1.2 and the remote sensing images are acquired; with the dry biomass as the ordinate y, correlation analysis is performed between the vegetation index calculated using the remote sensing images and the dry biomass; a vegetation index with the highest correlation is selected as the abscissa x for modeling, obtaining a model of y2=kx+b, which is used for monitoring plant dry biomass in the plot through the remote sensing images; and the actual nitrogen uptake of rice and wheat is a product of y1 and y2.

6. A rice and wheat nitrogen nutrition multispectral diagnosis system for precise fertilization by UAVs, based on the rice and wheat nitrogen nutrition multispectral diagnosis method for precise fertilization by UAVs according to claim 1, comprising:

a rice and wheat nitrogen nutrition remote sensing diagnosis module, configured to acquire multispectral UAV remote sensing images, collect agronomic parameters of rice and wheat, and establish a nitrogen nutrition spectral diagnosis model based on the multispectral UAV remote sensing images and the acquired agronomic parameters using machine learning algorithms;

a topdressing decision model generation module, configured to calculate the critical nitrogen concentration in the aboveground parts of rice and wheat based on the critical nitrogen concentration dilution model for an amount of dry matter, and further calculate the critical nitrogen uptake; calculate the actual nitrogen uptake in the aboveground parts of rice and wheat based on the rice and wheat nitrogen nutrition remote sensing diagnosis module; and calculate the recommended nitrogen topdressing amount of rice and wheat during corresponding stages based on the critical nitrogen uptake and the actual nitrogen uptake; and a digital multi-dimensional prescription map generation and agricultural UAV precise fertilization module, configured to use Super map, GlobalMapper software to save the recommended nitrogen application amount as an elevation image, generate the digital fertilization prescription map, and guide agricultural UAVs for precise fertilization operations.

* * * * *